United States Patent
Van der Lingen et al.

(10) Patent No.: US 6,725,803 B2
(45) Date of Patent: Apr. 27, 2004

(54) METHOD AND DEVICE FOR MILKING CATTLE

(75) Inventors: Daan D. Van der Lingen, Hasselt (NL); Peter W. Van der Sluis, Ijsselmuiden (NL); Franciscus J.P. De Vries, Nijeholtpade (NL)

(73) Assignee: Indento Electronics B.V., Ens (NL)

( * ) Notice: Subject to any disclaimer, the term of this patent is extended or adjusted under 35 U.S.C. 154(b) by 0 days.

(21) Appl. No.: 10/239,716

(22) PCT Filed: Mar. 27, 2001

(86) PCT No.: PCT/NL01/00249

§ 371 (c)(1),
(2), (4) Date: Jan. 8, 2003

(87) PCT Pub. No.: WO01/72115

PCT Pub. Date: Oct. 4, 2001

(65) Prior Publication Data

US 2003/0106496 A1 Jun. 12, 2003

(30) Foreign Application Priority Data

Mar. 29, 2000 (NL) .............................................. 1014780

(51) Int. Cl.⁷ ................................ A01J 3/00; A01J 5/00
(52) U.S. Cl. .................................. 119/14.02; 119/14.08
(58) Field of Search ........................... 119/14.02, 14.08, 119/14.14, 14.18, 14.32, 14.34

(56) References Cited

U.S. PATENT DOCUMENTS

| | | | | |
|---|---|---|---|---|
| 4,344,385 A | * | 8/1982 | Swanson et al. ......... | 119/14.08 |
| 4,574,736 A | * | 3/1986 | Tanaka et al. ........... | 119/14.08 |
| 5,195,456 A | | 3/1993 | van der Lely et al. | |
| 5,664,521 A | * | 9/1997 | Simpson et al. ......... | 119/14.02 |
| 5,823,134 A | * | 10/1998 | van den Berg .......... | 119/14.02 |
| 5,913,281 A | * | 6/1999 | van den Berg .......... | 119/14.18 |
| 6,371,046 B1 | * | 4/2002 | Petterson et al. ........ | 119/14.02 |
| 6,493,071 B2 | * | 12/2002 | van den Berg et al. ... | 119/14.08 |
| 2002/0162509 A1 | * | 11/2002 | Hakes ..................... | 119/14.02 |

FOREIGN PATENT DOCUMENTS

| | | |
|---|---|---|
| EP | 0534564 A | 3/1993 |
| WO | WO 9804119 A | 2/1998 |
| WO | WO 927770 A | 6/1999 |

\* cited by examiner

Primary Examiner—Charles T. Jordan
Assistant Examiner—Elizabeth Shaw
(74) Attorney, Agent, or Firm—Webb Ziesenheim Logsdon Orkin & Hanson, P.C.

(57) ABSTRACT

The invention relates to an apparatus for milking animals, having at least one teat cup for arranging on a teat of an udder of the animal a conduit connected to the teat cup for throughfeed of the milk milked with the teat cups to a storage and having a testing device for testing the milk, further having a pretreatment system which subjects the teats to a pretreatment, such as cleaning, and provides milk released herein or during the foremilking with the teat cup to the testing device.

11 Claims, 3 Drawing Sheets

METHOD AND DEVICE FOR MILKING CATTLE

BACKGROUND OF THE INVENTION

1. Field of the Invention

The present invention relates to a method and an apparatus for milking animals, wherein the apparatus comprises: at least one teat cup for arranging on a teat of an udder of the animal; a conduit connected to the teat cup for throughfeed of the milk milked with the teat cups to a storage; and testing means for testing the milk, and wherein the method comprises the steps of pretreatment, foremilking, and milking of at least one teat of an udder of a livestock animal, and testing the milk, and selectively separating milk on the basis of the findings during testing.

2. Description of the Related Art

It is noted that foremilking is a step in the method wherein milk is actually obtained using the teat cups. For diverse reasons, such as hygiene, cell count and so on, a previously determined or chosen quantity of the milk originating from a teat is automatically separated. In accordance with the wishes of a producer or a farmer, a determined initial period of the actual milking can be designated as the foremilking and the quantity obtained in that period is separated, irrespective of the quantity thereof. Alternatively, a predetermined first quantity in liters can be automatically separated. Irrespective of whether the foremilking is defined as an initial quantity or an initial period, it is chosen such that, after the foremilking, the milking results with certainty in milk which is good, reliable and so on.

Such apparatus and methods are known by way of example wherein the conduits run to a central storage, such as a milk collector, and the milk from each of the teats of the livestock animal is collectively tested for the quality hereof, for instance for the presence of mastitis.

A significant drawback of the known apparatus is that tests on the quality of the milk are only performed if the flow of milk milked from a quarter or the whole udder has already been started. This has the specific effect that if the quality of the milk from at least one quarter were found to be of inferior quality, some of this "affected" milk has already been transported to a central storage. This entails health hazards. In order to prevent such health hazards, all the milk in the central storage must still be thrown away.

SUMMARY OF THE INVENTION

The invention has for its object to at least partially, and preferably wholly, obviate the drawbacks of the known apparatus and methods, for which purpose there are provided an apparatus and a method which are distinguished respectively by a pretreatment system, which subjects the teats to a pretreatment, such as cleaning, and provides milk released herein or during the foremilking to the testing means, and by testing the milk obtained during pretreatment of at least the teats of the udder, such as the cleaning thereof, or during the foremilking. According to the invention the milk can be tested in the time available during the pretreatment, which is favourable for the reliability of the finally obtained test results or findings, while the milk from a teat with a "disorder" is with certainty wholly separated from the milk from the other teats which is of adequate quality. The quality of the milk for delivery is thus ensured. This as opposed to the situation where any testing only takes place during the actual milking of each of the teats.

In greater preference the milk obtained at the end of the foremilking is subjected to the test. Reference is made to the above definition of foremilking. "At the end of foremilking" is understood to mean a sample near the end of the period of foremilking, or which is obtained just before the chosen quantity of foremilk is obtained. Precisely because the foremilk is defined as a predetermined period or quantity, after which milk which is good, reliable, hygienically safe and so on is obtained with certainty, it can be stated with a great measure of certainty that this is also the case for a sample obtained near the end of the period or when the predetermined quantity is obtained which is designated as foremilk. The reliability of the test is hereby increased and the milk to be obtained thereafter can with great certainty still be either separated or not on the basis of the findings in the tests. This with great certainty and, moreover, completely. Not a drop of milk of insufficient quality need enter the main flow.

In a preferred embodiment the apparatus further comprises at least two conduits and at least two teat cups, wherein the conduits each comprise a branch with a controllable valve mechanism, wherein the valve mechanism is adapted to connect the teat cup to the branch, which is connected to an outlet, in response to findings of the testing means during individual testing of the milk originating from the relevant teats, and thus milking of at least two teats, individually testing the foremilk from each of the separate teats for a disorder such as mastitis; and selectively separating the milk originating from the relevant teats on the basis of the findings in the testing of the foremilk.

Another drawback is obviated with this embodiment, wherein milk originating from teats not affected by a disorder is lost, when it is determined in the test that only one of the teats of the livestock animal is affected by a disorder. Milk is therefore no longer lost unnecessarily if only one of the at least two teats is affected or in any case-produces milk of insufficient quality.

In this embodiment of the present invention the milking is not interrupted. Each of the teats is fully milked without a subsequent operation being necessary to later milk a teat which produces milk of insufficient quality so as to keep the milk originating herefrom separate from the rest of the milk of sufficient quality (if the milking of the "affected" teat were to be interrupted in the case of a finding that a disorder is present here). According to the present invention there is furthermore no milk lost from teats producing a milk of sufficient quality.

In the apparatus according to the present invention the valve mechanism can be designed in diverse ways and can be controlled in diverse ways, for instance electromechanically and/or pneumatically. A pneumatic control has the particular advantage that use is already made of a vacuum for the milking, so that existing systems can be adjusted in simple manner with such means in order to provide an apparatus according to the present invention.

The valve mechanism itself can also be designed in diverse ways, such as a mechanically controllable rotating valve, which connects either the teat cup to the branch, or the teat cup to the continuation of the conduit beyond the branch in the flow direction. As an alternative which in particularly advantageous manner can be designed in combination with a pneumatic control, at least one of the conduits, as well as the associated branch, is a flexible hose, and the associated valve mechanism comprises clamps on each of the conduit and the branch which in energized state close the passage therethrough, wherein a control for the valve mechanism is adapted to energize only one of the clamps at a time.

BRIEF DESCRIPTION OF THE DRAWINGS

The above described and other advantages, features and operation of the present invention will be elucidated on the basis of the figure description following hereinbelow, which is formulated only by way of example, with reference to the annexed drawing, in which.

DETAILED DESCRIPTION OF THE PREFERRED EMBODIMENTS

Figure 1:
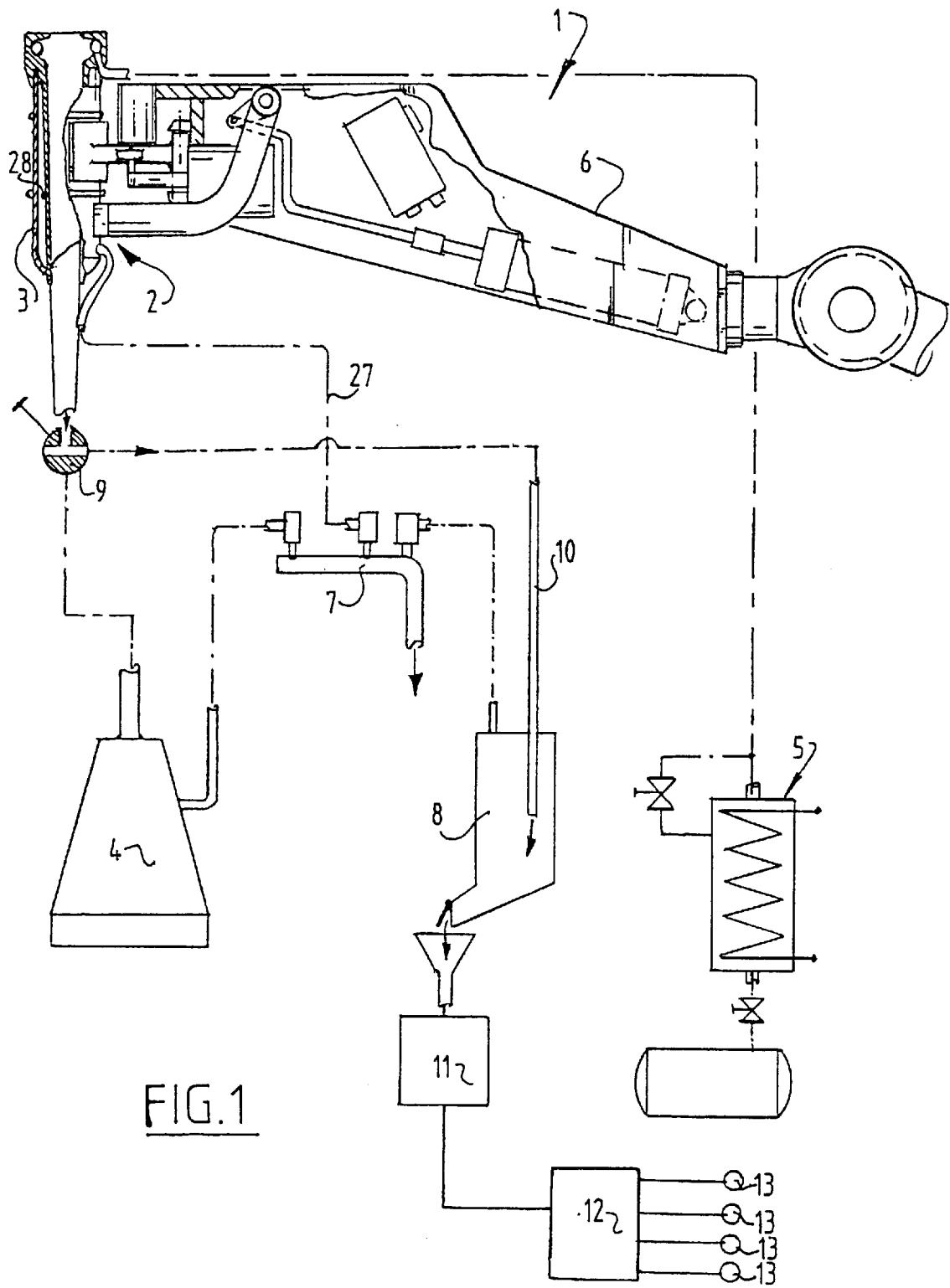
FIG. 1 shows a schematic view of an apparatus for realizing the method, both according to the present invention, during pretreatment of one of the teats of an animal for milking.

FIG. 1 shows a milking apparatus 1, and more particularly a pretreatment system 2 as a part of milking apparatus 1. The pretreatment system 2 comprises a pretreatment cup 3, which is connected to a water supply, not shown per se, a separation tank 4 and a hot air supply in the form of a heating 5 for the purpose of respectively washing and drying a teat on which pretreatment cup 3 is arranged, and discharging water used in washing of the teat to separation tank 4.

During this pretreatment, i.e. cleaning of the relevant teat, milk is released when pretreatment cup 3 is arranged on the relevant teat using a milking robot, of which a part of robot arm 6 is shown. The pretreatment system further comprises a vacuum hose 7 which is connected to pretreatment cup 3, separation tank 4 and an air-separator 8.

As will be further described hereinbelow, the milk is tested for disorders such as mastitis of the teat from which the milk originates.

So as not to adversely affect the test by applying used water (which is carried to pretreatment cup 3 via a supply which is not shown)-during pretreatment of the teat, particularly the washing hereof, the whole pretreatment can be completed before a sample of the foremilk for testing is obtained.

Additionally or alternatively, foremilk can be supplied to the testing means. Foremilk is the predetermined quantity of milk or the milk obtained in a predetermined period of time at the start of milking. This foremilk is by definition separated, which is usual in the art. This foremilk for standard separation is separated because of the properties hereof. This milk has been in the udder of the cow longest and is generally unusable for diverse reasons. The quantity or period of time for milk is chosen such that hazardous properties in the then obtained flow of milk have with certainty been passed before the flow of milk is sent to the main flow. As a result of the certainty in this respect, some good milk is with certainty also separated in standard manner as foremilk. This is the foremilk obtained at the end of the predetermined period during which the foremilk is separated, and if the quantity specifies the definition of foremilk, then some good milk is with certainty separated which is obtained just before the predetermined quantity is reached. By now using precisely this milk, a reliable sample is obtained and the subsequent actual flow of milk can, with a high degree of reliability and certainty, be separated or allowed through on the basis of the findings in the test.

The teat is herein first washed and dried with hot air from heater 5. Only then is valve 9 placed in the position shown in FIG. 1, while via pressure line 27 a pulsating action of a lining 28 in pretreatment cup 3 is maintained to obtain the sample of foremilk for testing in a manner similar to the subsequent milking of the teat. Pressure line 27 is herein connected to vacuum hose 7.

The above stated milk, which is released during the pretreatment, more particularly after the washing and drying, is carried to air separator 8 via a valve 9 and a conduit 10, wherein the foremilk flowing out of air separator 8 is presented to testing means 11. The testing means are connected in turn to a control 12 in order to provide to control 12 information on the findings of the test on the foremilk, which can for instance be a test to determine whether the relevant teat has a disorder such as mastitis. Control 12 is in turn connected to controllable valve mechanisms 13, to be further described hereinbelow, in the actual milking arrangement, embodiments of which are described hereinbelow with reference to FIGS. 2 and 3.

It is noted that, as noted above, it is equally possible within the scope of the invention that the first milk released in a usual milking process—in contrast to the above in a separate pretreatment, such as after washing and drying—can be used for a test for a disorder such as mastitis. This is called the "foremilk".

If the testing means come to the conclusion that the teat from which the tested milk or foremilk originates has a disorder, the relevant valve mechanisms 13 are then controlled by control 12 such that the milk obtained thereafter during the normal milking process of this teat is separated and does not enter the flow of milk coming from teats with no disorder.

Figure 2:
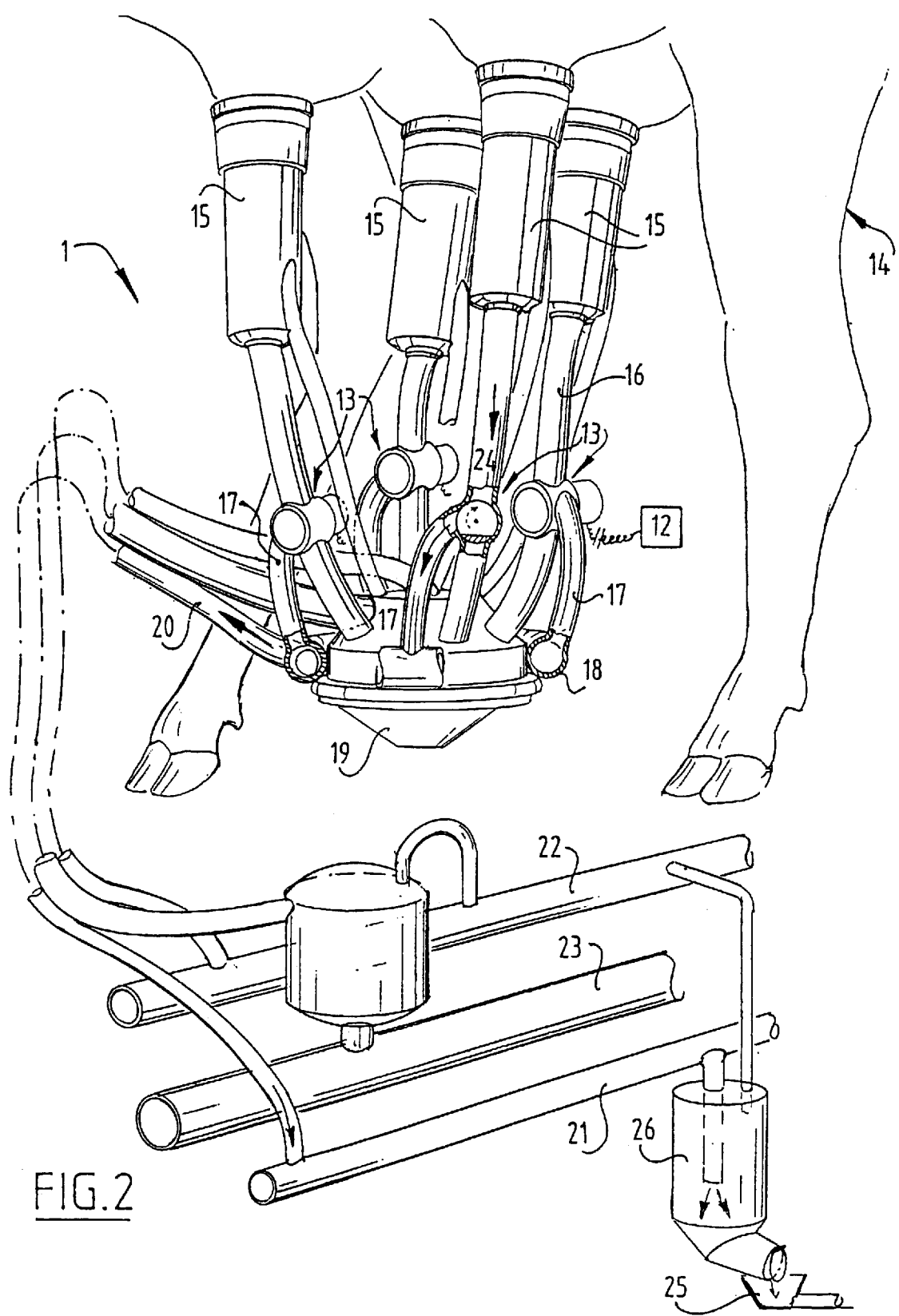
FIG. 2 is a perspective view of a part of the apparatus for realizing the method, both according to the present invention, during milking.

FIG. 2 shows a different part of milking apparatus 1 than in FIG. 1. FIG. 2 relates to that part of milking apparatus 1 which is intended for actually milking, in the example shown here, a cow 14.

The part shown in FIG. 2 of milking apparatus 1 as addition to the pretreatment system 2 according to FIG. 1 comprises teat cups 15, which are each connected to a conduit 16 for throughfeed of milked milk. The above mentioned valve mechanisms 13 are arranged in conduit 16. From the valve mechanisms 13, which are further described hereinbelow, branches 17 run to a chamber 18 which is separate of a milk collector 19. This milk collector 19 serves to combine the flows of milk coming from teat cups 15. If however the testing means 11 shown in FIG. 1 have determined that the milk from a relevant teat of the udder of cow 14 has a disorder such as mastitis, the valve mechanism 13 associated with the cup 15 for this relevant teat is adjusted by control 12 to connect the relevant teat cup to chamber 18 via the associated branch 17. The milk from the teat with a disorder, such as mastitis, is thus kept separate from the milk from the "healthy" teats, which is combined in milk collector 19. Chamber 18 is moreover connected via discharge conduit 20 to an outlet 21 for separate removal of the milk from a teat which has been determined with testing means 11 as having an insufficient quality.

The part of milking apparatus 1 of FIG. 2 otherwise comprises a vacuum hose 22 and a conduit 23 for discharge of "approved" milk, which co-act in per se known manner with milk collector 19 and the other components in order to milk the cow 14.

The control 12 for one of valve mechanisms 13 as shown in FIG. 1 is also shown in FIG. 2. Each of the valve mechanisms 13 shown in FIG. 2 is of course connected to this control 12.

It is further noted that in the embodiment shown here use is made for the valve mechanisms 13 of rotating valve 24.

In FIG. 2 one of the valve mechanisms 13 is cut away, wherein rotating valve 24 is indicated therein. In the position of this rotating valve 24 shown in FIG. 2 the milk originating from teat cup 15, which is connected to this relevant valve mechanism 13 via conduit 16, is separated via the branch 17 connected to the valve mechanism 13 cut away in FIG. 2. This milk is thus separated from the other milk flows which come from the other teat cups 15 and which do come together in milk collector 19. From chamber 18 this separated milk is carried via discharge conduit 20 to outlet 21, wherein this "rejected" milk is poured into a drain 25 via an air separator 26.

Figure 3:
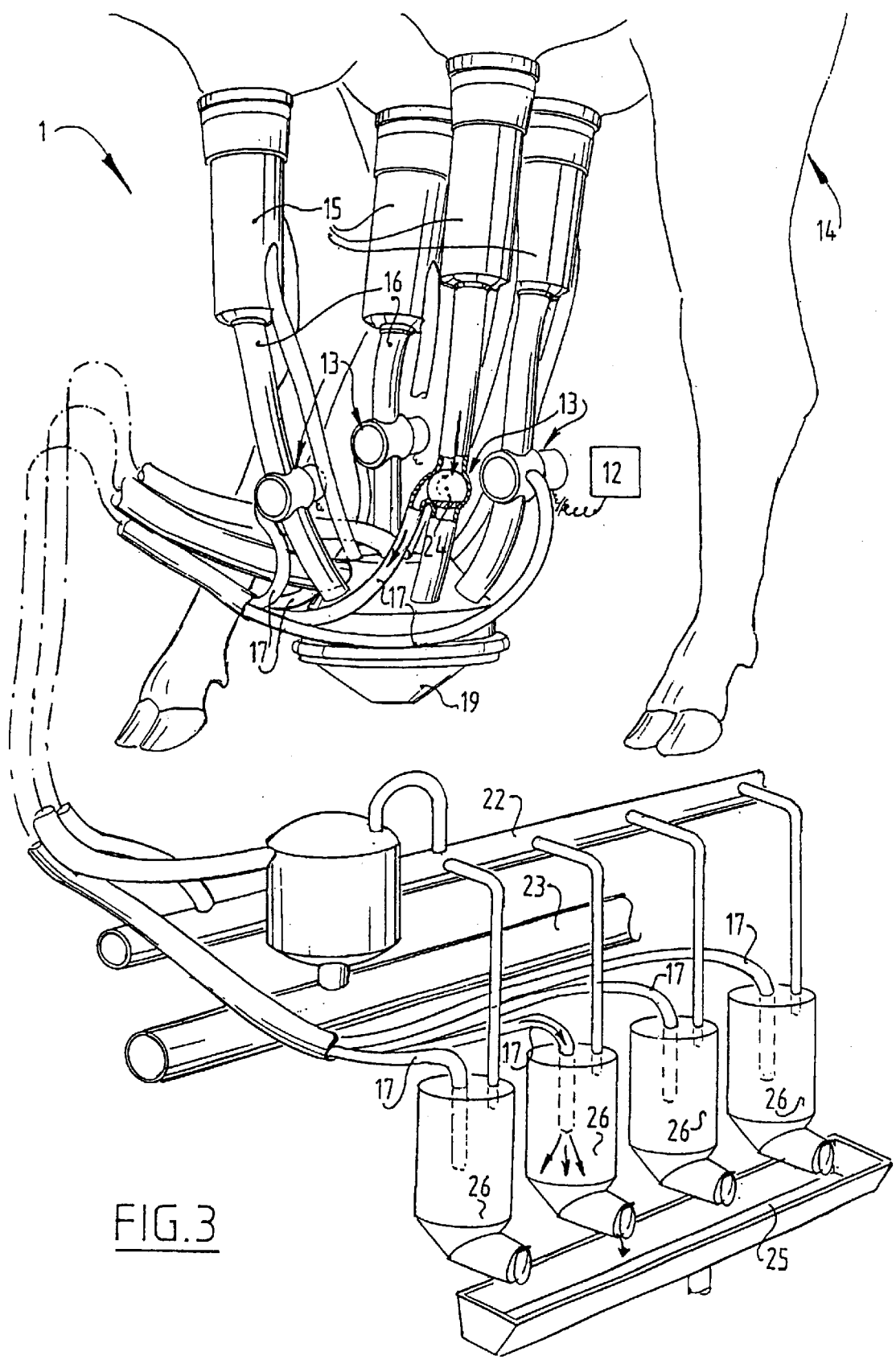
FIG. 3 shows an alternative embodiment relative to that shown in FIG. 2.

The embodiment shown in FIG. 3 of a part of milking apparatus 1 similar to that shown in FIG. 2 is distinguished from the configuration of FIG. 2 in that, no separate collecting chamber such as chamber 18 in FIG. 2 is provided in the vicinity of milk collector 19. Separate branches 17 thus run along milk collector 19 to separate air separators 26 to the drain 25 for "rejected" milk.

It will be apparent that many additional and alternative embodiments will occur to the skilled person after perusal of the foregoing, which alternatives, additions and modifications etc. must all be deemed as lying within the scope of the invention as defined in the appended claims. The valve mechanisms, which in FIGS. 2 and 3 are designed as rotating valves, can alternatively or additionally be formed as clamps which act on conduits 16 and branches 17 to close them by squeezing. In such an alternative embodiment the conduits 16 and branches 17 are thus flexible hoses which can be closed by squeezing. A first clamp can herein act on conduit 16 in the flow direction of milked milk at a position beyond valve mechanism 13, and another clamp can act on branch 17. The control must therefore energize at most one of the two clamps forming the relevant valve mechanism 13 in order to determine the flow direction of the milk coming from teat cup 15, i.e. separation in the drain for "rejected" milk, or throughfeed and use of "approved" milk. In contrast to the configurations shown in FIG. 2 and in FIG. 3, a part of the interior of the milk collector can further be reserved for collection of "rejected" milk in a separate chamber in this milk collector. The milk for testing can also be obtained at the start of a normal milking process. Many alternatives, additions and modifications are thus possible within the scope of the present invention.

What is claimed is:

1. An apparatus for milking animals, comprising at least one teat cup for arranging on a teat of an udder of the animal; a conduit connected to the teat cup for throughfeed of the milk milked with the teat cups to a storage; testing means for testing the milk; a pretreatment system which subjects the teats to a pretreatment; and separating means to separate milk indicated by the testing means, wherein the apparatus is arranged to provide milk released during pretreatment or during the foremilking with the teat cup to the testing means, which test the milk on disorders for which all milk from the teat is to be separated and control the separating means to separate all milk from said teat.

2. The apparatus as claimed in claim 1, comprising at least two conduits and at least two teat cups, wherein the conduits each comprise a branch with a controllable valve mechanism, wherein the valve mechanism is adapted to connect the teat cup to the branch, which is connected to an outlet, in response to findings of the testing means during individual testing of the milk originating from the relevant teats.

3. The apparatus as claimed in claim 2, wherein a control for the valve mechanism is electro-mechanical.

4. The apparatus as claimed in claim 2, wherein a control for the valve mechanism is pneumatic.

5. The apparatus as claimed in claim 2, wherein at least one valve mechanism comprises a rotating valve, which selectively connects the relevant conduit and the branch to each other.

6. The apparatus as claimed in claim 2, wherein at least one of the conduits, as well as the associated branch, each comprise a flexible hose, and the associated valve mechanism comprises clamps on each of the conduit and the branch which in an energized state close the passage therethrough, wherein a control for the valve mechanism is adapted to energize only one of the clamps at a time.

7. The apparatus as claimed in claim 1, wherein the pretreatment system comprises at least one pretreatment cup for washing and drying a teat under the influence of a pulsating effect, wherein the pretreatment cup is connected to the testing means to provide milk samples of foremilk obtained after completion of the pretreatment to the testing means.

8. A method for milking animals, comprising the steps of pretreating at least one teat of an udder of a livestock animal; foremilking the teat; milking the teat; testing the milk from the teat; and selectively separating the milk from the teat on the basis of the findings during testing, wherein the testing further comprises testing milk obtained during pretreatment of at least the teats of the udder, or during the foremilking for a disorder such as mastitis, for which all the milk from said teat is to be separated and separating all milk from said teat for the case said disorder is found.

9. The method as claimed in claim 8, further comprising of testing the milk obtained shortly before the end of the foremilking.

10. The method as claimed in claim 8, further comprising milking at least two teats, individually testing the milk from each of the teats and selectively separating per teat the milk subsequently coming from the relevant teat.

11. The method as claimed in claim 8, further comprising maintaining the action on the teat after completion of the pretreatment, and providing to the testing means samples for testing of the milk from the relevant teat without means, such as rinsing water, applied during the pretreatment.

* * * * *